UNITED STATES PATENT OFFICE.

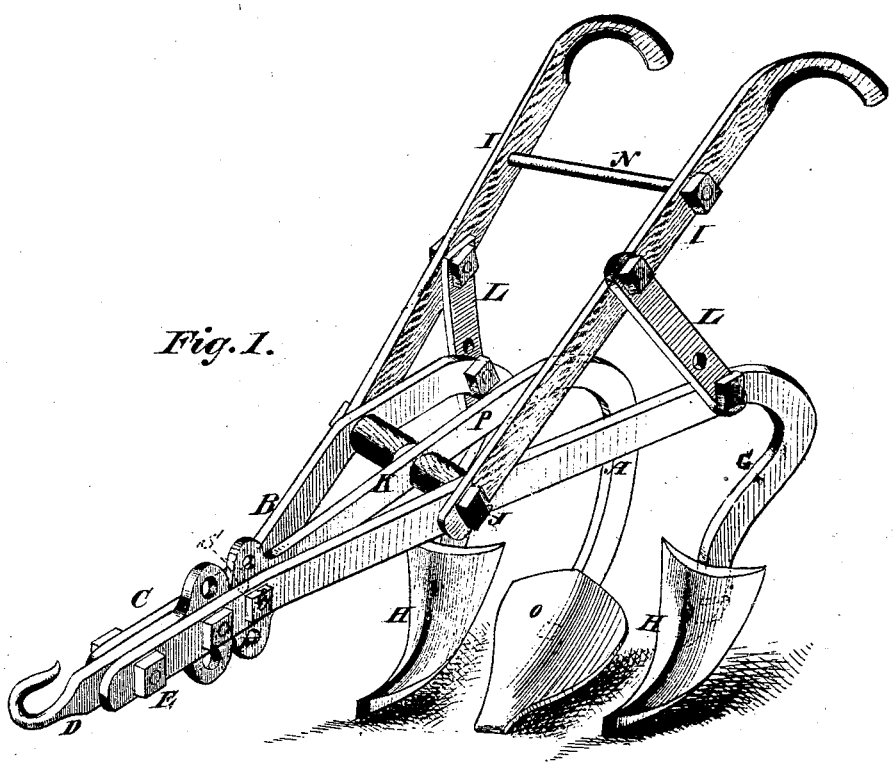
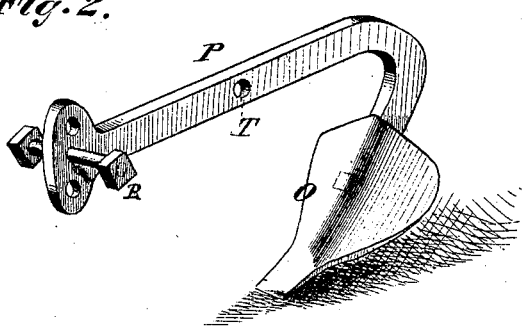

ROBERT P. VAN HORNE, OF GRATIOT, OHIO.

IMPROVEMENT IN DOUBLE-SHOVEL PLOWS.

Specification forming part of Letters Patent No. 111,793, dated February 14, 1871.

*To all whom it may concern:*

Be it known that I, ROBERT PATEN VAN HORNE, of Gratiot, in the county of Muskingum and State of Ohio, have invented a new and useful Improvement in Double - Shovel Plows; and I do hereby declare that the following is a full, clear, and exact description thereof, which will enable others skilled in the art to make and use the same, reference being had to the accompanying drawings, forming part of this specification.

This invention relates to an improvement in plows; and it consists in providing them with a supplementary plow secured to a removable beam, which is arranged in such a manner that the plow can be adjusted independently of the other plows upon the same implement, as will hereinafter more fully appear.

In the accompanying drawings, Figure 1 represents a perspective view of a double-shovel plow constructed according to my invention. Fig. 2 is a perspective view of the removable beam and supplementary plow.

Similar letters of reference indicate corresponding parts.

A is the main beam. B is the branch beam. These beams are connected together by bolts at their front ends, as seen at C; but the adjustable draft-hook D intervenes.

E is a bolt, which passes through the ends of the beams and through the hook. F is another bolt, which also passes through the three pieces, and upon which the hook is adjusted so as to govern the depth of the plow-furrows. The two beams as they extend back from the draft-hook are spread apart, the branch beam being much the shortest. The back ends of both beams curve downward, as seen at G G.

H H are the shovels, which are attached to the curved ends of the beams in any suitable manner, usually by bolts, and so that they can be readily removed.

I I are the handles, which are attached to the beams by means of the bolt J, which passes through the tubular stretcher K.

L L are braces, attached by bolts to the handles and to the beams, but made adjustable on the beams by holes in the braces, so that the handles may be raised or lowered at pleasure.

N is the stretcher-round through the handles.

The shovels are of the usual form.

The removable beam and shovel are attached to the beams A B by means of the bolt R, which passes through the holes S in the beams A B, and the bolt J, which passes through the hole T in the beam P. Thus this beam will be arranged alongside the beam A, and may be employed with or without the shovels H. It will be likewise adjustable at its front end, being provided with holes for the purpose.

The removable beam P works upon the bolt J, so that it may be adjusted by means of the bolt R and the holes in the front end of the beam, causing the plow O to plow either at the same, a less, or a greater depth than the plows H H.

Having thus described my invention, I claim as new and desire to secure by Letters Patent—

In combination with the main beam A, branch beam B, plows H H, hook D, handles I I, adjustable braces L L, stretchers K N, and clamping-bolts E F, arranged relatively one to the other, the removable plow-beam P, provided with the shovel O, constructed as described, for the purpose specified.

R. P. VAN HORNE.

Witnesses:
    J. S. JOHNSTON,
    SARAH VANHORN.